March 5, 1946. T. L. THURLOW 2,395,921
HORIZONTAL REFERENCE MEANS FOR SEXTANTS AND THE LIKE
Filed April 11, 1944 2 Sheets-Sheet 1

INVENTOR
THOMAS L. THURLOW
BY
ATTORNEYS

March 5, 1946.   T. L. THURLOW   2,395,921
HORIZONTAL REFERENCE MEANS FOR SEXTANTS AND THE LIKE
Filed April 11, 1944   2 Sheets-Sheet 2

INVENTOR
THOMAS L. THURLOW
BY
ATTORNEYS

Patented Mar. 5, 1946

2,395,921

UNITED STATES PATENT OFFICE 2,395,921

HORIZONTAL REFERENCE MEANS FOR SEXTANTS AND THE LIKE

Thomas L. Thurlow, Venice, Calif.; Alma Lois Thurlow executrix of said Thomas L. Thurlow, deceased Application April 11, 1944, Serial No. 530,566

7 Claims. (Cl. 88—2.4)

(Granted under the act of March 3, 1883, as amended April 30, 1928; 370 O. G. 757)

The invention described herein may be manufactured and used by or for the Government for governmental purposes, without the payment to me of any royalty thereon.

This invention appertains to means for determining the relation of a point of observation to a point or plane of reference, and, more particularly, to means for orienting the point of observation with respect to the horizontal or the vertical plane at such point. Such means are referred to herein as horizontal reference means, and are sometimes referred to as artificial horizon means. Means of this type are useful in connection with various types of sighting instruments, angle-measuring instruments, altitude-measuring instruments, and the like, wherein it is necessary or desirable that the instrument be oriented with respect to such point or plane of reference.

For example, in the use of a sextant, the altitude of a celestial body is measured by reference to the angle which such body makes with the horizontal plane at the point of observation. This may be accomplished by sighting the instrument with reference to a point on the horizon. However, it is advantageous for many purposes to provide a horizontal reference means or so-called "artificial horizon." For the purposes of sextants and the like it is convenient to provide such horizontal reference means in conjunction with the instrument in such manner that there will be produced within the sighting portion of the instrument a reference image of an illuminated spot or line whose orientation with respect to the true horizon or horizontal plane is known and is maintained constant irrespective of the motion of the instrument.

Horizontal reference means designed for this purpose have been heretofore proposed incorporating the familiar bubble level together with means for reproducing the image of the bubble apparently within the plane of the image of an object sighted upon, as illustrated, for example, in United States patents of Willson et al., No. 1,705,146 and Thurlow et al., No. 2,173,142. The use of such artificial horizon means in conjunction with a sextant involves adjustment of the instrument until the reference image is in coincidence with the image of the star or other object sighted upon.

The use of a bubble level in such applications is subject, however, to certain disadvantages. For instance, expansion and contraction of the liquid may vary the size of the bubble and hence increase the difficulty of obtaining coincidence of the star image and the reference image. In the use of the bubble level for the above purpose, it is necessary to carefully select a proper depth of liquid, adjust the bubble to proper size, and then to maintain these factors constant under all conditions of temperature and other varying physical conditions to which the instrument may be subjected in use.

Another characteristic of the bubble level type of artificial horizon means is that the reference image produced is not sharply defined so that only approximate coincidence of the image of the object sighted upon with that of the reference image is obtainable under the most favorable conditions. Obviously the accuracy of measurement increases as the ability to obtain exact coincidence increases and the latter is, of course, facilitated and limited by the sharpness of definition of the reference image.

Other difficulties encountered in connection with artificial horizon means of the bubble level type have to do with accuracy of curvature of the meniscus and other optical elements, acceleration, vibration, and like effects, sticking of the bubble due to viscosity, freezing, and like effects varying the condition of the liquid.

The foregoing and other factors affect not only the initial accuracy of the reference image as a trustworthy indicator of the true reference plane, but affect its responsiveness to maintenance of proper orientation with the true reference plane as the position of the instrument changes with respect thereto.

It is a principal object of the present invention to provide a comparatively simple and novel horizontal reference means avoiding many of the difficulties and complications of means heretofore proposed for this purpose.

Another object of the invention is to provide horizontal reference means of relatively simple and inexpensive construction which is capable of producing an indication of the true reference plane with a high degree of accuracy.

Another object of the invention is to provide horizontal reference means having improved characteristics facilitating accurate coincidence of the reference image with the image of the object sighted upon.

A further object of the invention is to provide horizontal reference means capable of producing a sharply defined reference image.

Another object of the invention is to provide horizontal reference means having improved characteristics of responsiveness to maintenance of orientation with variations of position of the instrument in conjunction with which said means is employed.

Another object of the invention is to provide horizontal reference means utilizing a liquid pool having a freely formed surface.

Another object of the invention is to provide horizontal reference means utilizing a liquid pool having a freely formed surface which always seeks a horizontal plane and which, whenever its container is tilted from the vertical of the locality, constitutes a prism whose angle corresponds to the angle of tilt of the container from the vertical of the locality.

In carrying my invention into practice, I provide a liquid pool in a container such that the free formation of the surface of the pool is uninhibited, a source of light fixed with respect to the container and directing an original beam of light toward said surface, and means for reflecting light entering said liquid, said means comprising a reflecting surface with its plane perpendicular to the direction of the original beam, the liquid having an index of refraction such that the beam of light emerging from the liquid makes an angle with the original beam substantially corresponding to the angle of displacement of the container from its vertical position. The aforesaid reflecting surface is provided at or constitutes the bottom of the pool. Thus, when the reflecting surface at the bottom of the liquid is parallel with the freely formed surface of the liquid, said reflecting surface is horizontal, the original light beam is vertical, and the reflected beam coincides with the original beam. When the container is tilted from the vertical of the locality, the reflecting surface at the bottom of the liquid pool no longer parallels the freely formed surface of the pool but makes an angle therewith which corresponds to the angle of tilt of the container from the horizontal plane and, likewise, from the vertical of the locality. Similarly, of course, the original light beam makes a corresponding angle with the vertical of the locality. The liquid employed in the horizontal reference means of the invention has an index of refraction such that for small angles of tilt of the container, the angle which the reflected and refracted light beam emerging from the pool makes with the original light beam is substantially equal to the angle of tilt of the container with respect to the vertical of the locality.

I further provide a second reflecting surface fixed with respect to the liquid container and disposed at an angle of 45° to the axis of the original light beam. The beam emerging from the liquid pool is caused to strike the second or 45° reflecting surface. The beam reflected by the latter surface will thus be directed in a substantially horizontal plane and will remain so for small angles of tilt of the liquid container from its vertical position.

For the purposes of obtaining a sharply defined reference image, I provide a reticule fixed with respect to the liquid container and having a sharply defined target such as may be provided by narrow parallel, predeterminately spaced slits in an otherwise opaque reticule member. Light from any suitable source is caused to pass through the slits, is collimated by suitable means provided for such purpose, and the beams of parallel light rays are directed perpendicularly to the plane of the reflecting surface at the bottom of the liquid pool, as aforementioned. The reticule target slits will thus produce a sharply defined reference image comprising brightly illuminated parallel sharp lines appearing to move in a vertical plane when examined with the eye placed in suitable position to receive the beam reflected from the second or 45° reflecting surface.

In the application of the invention to a sextant, the liquid container is associated therewith in fixed relation thereto with the other elements in their specified relation such that the optical system of the sextant per se is made to produce an image of the terrestrial or celestial object sighted upon within the field of view of the reference image. Under such conditions the orientation of the image of the observed object with respect to the reference image will not be disturbed by tilting or rotation of the sextant through small angles in the vertical plane containing the line of sight, i. e., as the instrument is tilted, the two images will appear to move across the field of vision in the same direction and at the same rate, thus always maintaining the same relation regardless of the tilt of the instrument so that the latter factor can be disregarded. The field of vision is so small, relatively, that the divergence of the reflected light beam producing the reference image from the true horizontal plane is of a very minor order for all angles of tilt of the instrument at which the respective images are within the field of view.

Coincidence of the reference image and the image of the object sighted upon may be effected by adjustment of the sextant plane index mirror, at which time the light rays producing the respective images will be parallel and horizontal so that the angle between the planes of the index and horizon mirrors of the sextant will correspond to the angle at the point of observation between the horizontal plane and object sighted upon.

Other objects, advantages, and features of the invention will be apparent from the following detailed description taken in conjunction with the accompanying drawings, in which—

Figure 1:
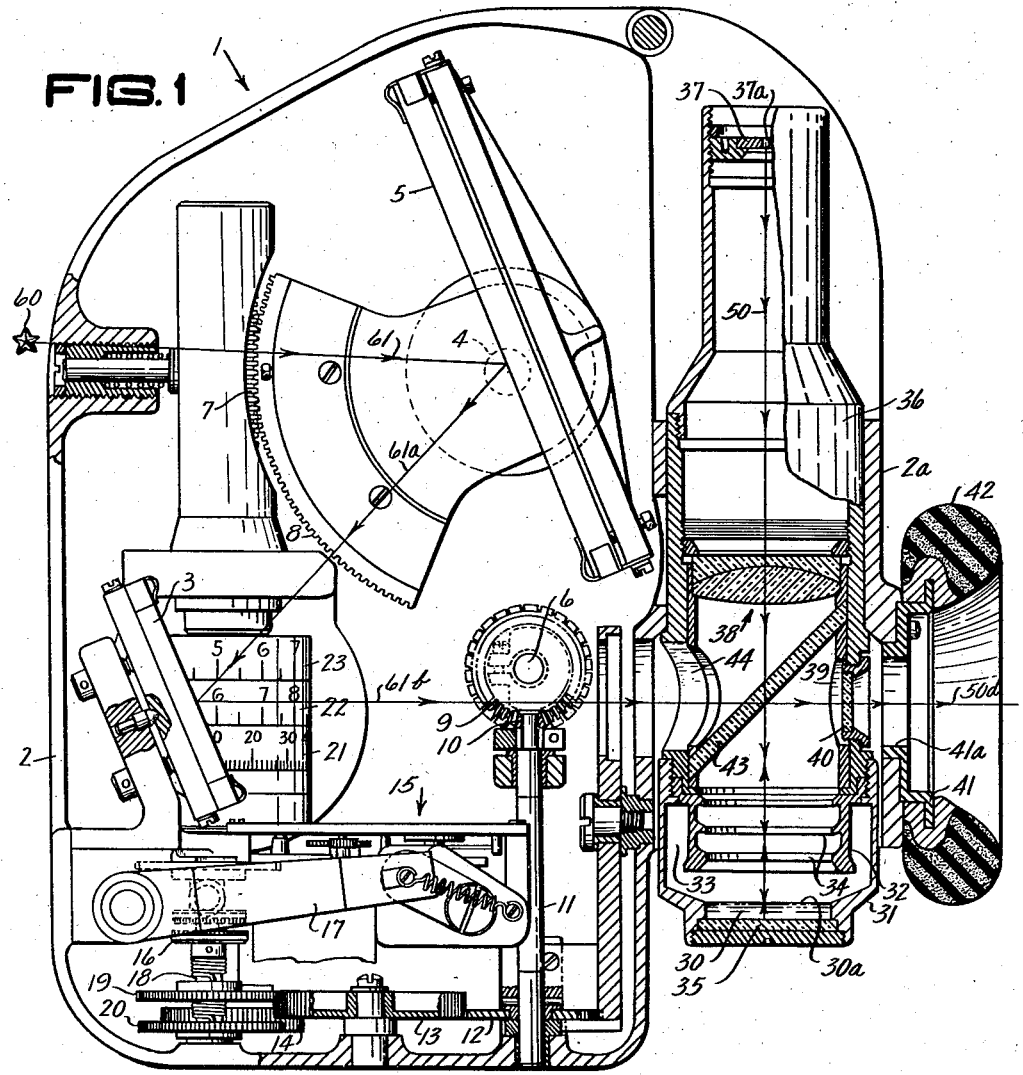
Fig. 1 is a vertical sectional view taken through a sextant, illustrating one embodiment of the invention, certain of the elements appearing in section and others in elevation.
Figure 3:
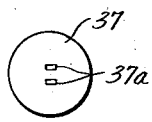
Fig. 3 is a plan view of the reticule comprising an element of the horizontal reference means of the invention.

Now, referring to the drawings for a detailed description of the invention, the numeral 1 generally designates a sextant including a frame 2 having secured thereto the fixed plane horizon mirror 3 and having journaled therein the index shaft 4 carrying the plane index mirror 5. Any suitable means may be provided for rotating the index mirror 5 about its axis 4 in order to adjust the index mirror 5 with respect to the horizon mirror 3. The means illustrated for this purpose comprises an operating shaft 6 suitably journaled in the frame 2 and rotated by a suitable hand knob (not shown) from the outside of the instrument housing, said operating shaft 6 being drivingly connected, through suitable gearing, with a worm shaft 7 meshing with a sector gear 8 fixed to the index mirror 5, whereby rotation of the operating shaft 6 effects rotation of the index mirror about its axis 4. The intermediate gearing includes a gear 9 fixed to shaft 6 and meshing with pinion gear 10 fixed to shaft 11 journaled in frame 2. Shaft 11 drives a gear train including gear 12 fixed to shaft 11 and meshing with idler gear 13 which in turn meshes with gear 14 fixed to worm shaft 7. Escapement mechanism generally designated by the numeral 15 is adapted to be drivingly connected, when desired, to the gear train upon engagement of clutch means 16 effected by operation of lever means 17, whereby the rate of adjustment of the index mirror may be limited. When the clutch means 16 is engaged, the escapement mechanism is drivingly connected to the gear train through a driven shaft 18 driven by gears 19 and 20 mounted on shaft 18 and meshing with gears 13 and 14 respectively, the gears 19 and 20 being associated with shaft 18 for rotation thereof, always in the same direction regardless of the direction of rotation of operating shaft 6.

Register mechanism, comprising the annular members 21, 22 and 23 drivingly connected to the worm shaft 7 by planetary gearing or other means so as to turn at different rates and bearing suitable indicia thereon for cooperation with appropriate indicia stationary with the frame of the instrument, is provided for indicating the angle of the plane of the index mirror 5 with respect to the plane of the horizon mirror 3. When the index mirror 5 is parallel with the horizon mirror 3, the instrument is set to measure zero degrees altitude.

The specific operating means for effecting and indicating the adjustment of the index mirror 5, and including the escapement and register mechanisms and associated elements, is more fully described and claimed in my copending application entitled "Observation instrument."

The horizontal reference means of my invention as illustrated by the embodiment of the accompanying drawings comprises a liquid pool 30 confined within a non-spill cell consisting of a tubular housing 31 and an annular sleeve element 32 positioned therein so as to provide an annular pocket 33 into which the liquid may flow along the wall of the housing 31 when the instrument is tilted, the element 32 being provided with annular ledges 34 to catch any liquid that may drip from the housing wall during tilting. This construction of the liquid pool cells prevents spilling of the liquid while permitting light from outside the cell to pass through the annular element 32 to the liquid without interruption or interference.

The liquid container and the amount of liquid therein are such that the surface of the liquid pool exposed to the light is freely formed, i. e., there is nothing confining the exposed surface of the pool to disposition in a particular plane having a predetermined relation to the container, but the pool's surface always assumes the plane determined by gravity, namely, a substantially horizontal plane.

A mirror 35 is secured within the housing 31 in such a manner that the liquid pool normally rests on the mirror's reflecting surface so that the plane of the latter surface determines the bottom plane of the pool.

Means are provided for causing a beam of light to be incident upon the freely formed surface 30a of the liquid 30, the direction of the beam being fixed with respect to the liquid pool container housing 31 and perpendicular to the reflecting surface of the mirror 35. To this end, the liquid container 31 is associated with a light tube 36 within which is secured a reticle 37 disposed in the focal plane of a collimating lens 38. The reticle 37 may comprise an opaque plate element having the parallel slits 37a therethrough, said slits preferably being spaced a predetermined distance apart such as 30 minutes of arc which is approximately the apparent diameter of the sun as observed from a point on or near the earth. The reticle may be illuminated by any suitable source of light such as by means of an incandescent bulb disposed within the light tube 36 above the reticle 37, or, as in the manner shown, by outside illumination either natural or artificial, the tube 36 being open at its upper end for this purpose.

The reticle slits 37a are preferably located substantially on the axis of the light tube 36.

Intermediate the collimating lens 38 and the liquid pool 30, the light tube 36 is provided with a sight opening 39 within which may be mounted a piece of plane glass 40. A suitable eyepiece 41 may be provided with a tubular section 41a constituting a sight tube in register with the sight opening 39, said eyepiece being provided with an annular headrest or cushion 42 formed of sponge rubber or the like. The axis of the sight tube 41a is perpendicular to the axis of the light tube 36.

Positioned at the intersection of the axes of the sight tube 41a and light tube 36 is a transparent plane glass plate 43 extending across the light tube 36 intermediate the lens 38 and liquid pool 30 and inclined at an angle of 45° to the sight axis. While glass plate 43 is transparent, its surfaces reflect some of the light incident thereupon. The tube 36 is also provided with a second sight opening 44 diametrically opposed and registering with the sight opening 39 and on the axis of sight of tube 41a.

The light tube 36 may be secured in a suitable fixture 2a forming a part of the frame 2 of the sextant 1.

The operation of the horizontal reference means of the invention is as follows:

Light from above the reticle 37 passes through the slits 37a, the light rays being rendered parallel to the axis of the light tube 36 by the collimating lens 38, since the reticle 37 is in the focal plane of the lens. Hence all light passing through the reticle 37 can be represented as a beam of parallel rays parallel to the axis of the light tube 36 and indicated by the line 50 traveling in the direction of the arrows. If the axis of the light tube 36 coincides with the vertical of the locality, as illustrated in Fig. 1, the light beam 50 emerging from the lens 38 passes through the clear glass reflector 43, enters the liquid pool 30 perpendicular to its freely-formed surface 30a, and hence continues vertically downward, striking mirror 35 perpendicular to its surface and is reflected vertically upward thereby. The upward traveling vertical light beam emerges from liquid pool 30 perpendicular to its freely-formed surface 30a and hence continues vertically upward coincident with light beam 50 striking clear glass reflector 43. Some of the upward traveling light striking reflector 43 will be reflected thereby at an angle thereto equal to the angle of incidence of the upward traveling light upon the reflector 43. The light thus reflected by the reflector 43 may be represented as a beam of parallel light rays indicated by the line 50d traveling in the direction of the arrows. Since the angle of incidence of the upward traveling light upon the reflector 43 is 45°, the angle of reflection of the light beam 50d from the reflector 43 will be 45°. Hence, the beam 50d is perpendicular to the direction of the upward traveling light which is coincident with vertical beam 50, and consequently the beam 50d is traveling in a horizontal plane.

It will be apparent that whenever the light tube 36 and liquid container 31 are rotated in the plane of the paper (Fig. 1) from the vertical position of said figure, the light beam 50 no longer strikes the freely-formed surface 30a of the liquid 30 in a direction perpendicular thereto but is incident upon said surface 30a at an angle equal to the angle of such rotation from the vertical of the locality.

Figure 2:
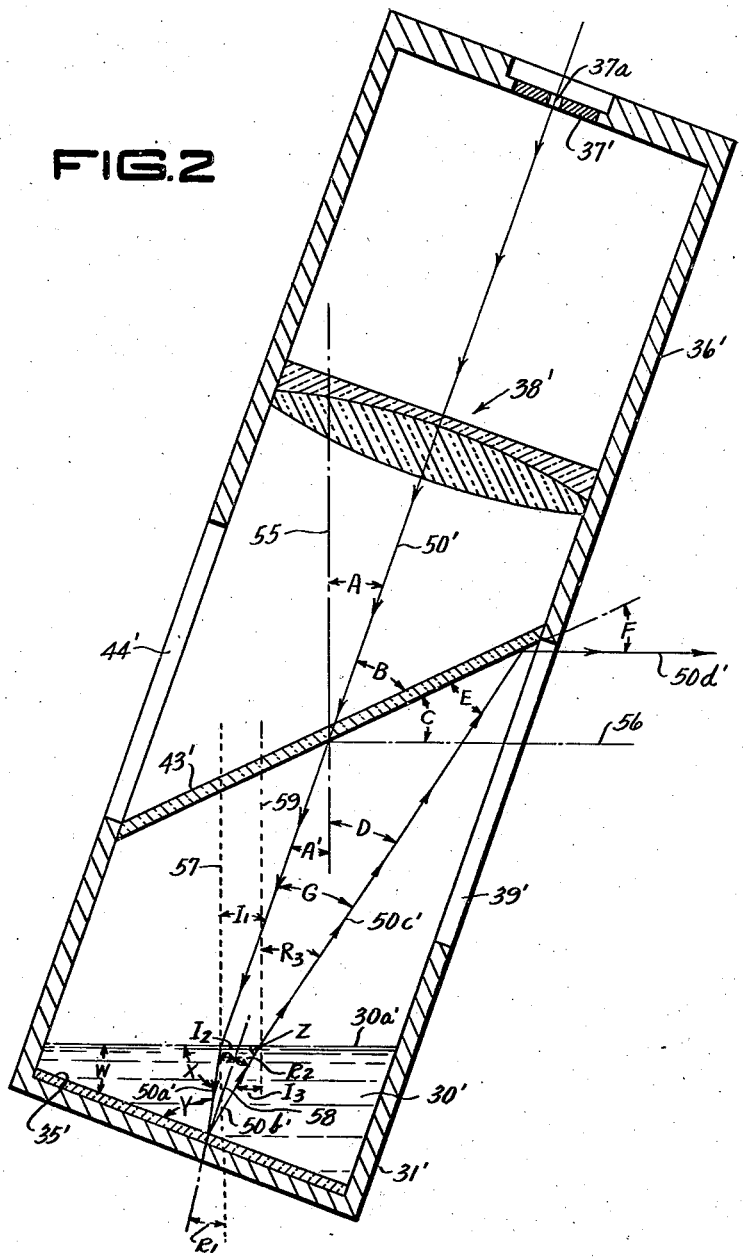
Fig. 2 is a sectional and primarily diagrammatic view illustrating the optical system of the horizontal reference means of the invention.

The operation of the device when it is rotated in the plane of the paper from the vertical position of Fig. 1 is diagrammatically illustrated in Fig. 2 wherein like parts corresponding to those of Fig. 1 have been designated by corresponding reference characters bearing a prime designation. In Fig. 2, the light tube 36' and liquid container 31' are illustrated as having been rotated through an angle A from the vertical of the locality, represented in said figure by the dot-and-dash line 55. The light beam 50' is incident upon the freely-formed surface 30a' at angle I₁, equal to the angle of rotation A, is bent or refracted by the liquid 30', as indicated at 50a', at an angle of refraction R₁ so that it is incident upon the mirror 35' at an angle of incidence I₂, is reflected by the mirror 35', as indicated at 50b', at an angle of reflection R₂, and is again refracted as indicated at 50c', upon emerging from the liquid 30', at an angle of refraction R₃. The reflected and refracted beam 50c' emerging from the liquid 30' strikes the clear glass reflector 43' at an angle of incidence E and is reflected, as indicated at 50d', by the reflector 43' at an angle of reflection F equal to the angle of incidence E. For the purposes of the invention, it is desired to make provision such that the beam 50d' reflected to the observer's eye is always substantially horizontal.

The invention contemplates that the index of refraction of the liquid 30 shall be such as to so direct the emergent beam 50c' as to accomplish the desired result. Otherwise expressed, the invention contemplates that the index of refraction of the liquid 30 shall be such that for small angles of tilt or rotation of the light tube 36 in the plane of the paper (Fig. 1), the angle G which the reflected and refracted beam 50c', emerging from the liquid pool 30' and traveling upwardly makes with the original beam 50' is substantially equal to the angle of rotation A of the light tube 36 with respect to the vertical 55 of the locality.

For this purpose, I employ a liquid 30 having an index of refraction of substantially 1.5.

Thus, when the instrument of Fig. 1 is tilted or rotated in the plane of the paper from the position of said figure, so that the axis of light tube 36 no longer coincides with the vertical of the locality, the beam 50d' is, nevertheless, still reflected in a substantially horizontal plane for all cases in which the angle of rotation A is such that the upward traveling light beam 50c' emerging from the liquid 30 strikes the reflector 43 so as to be reflected within the field of view of the eyepiece 41. In other words, as viewed through the eyepiece 41, the image of the reticule slits 37a appearing projected to infinity in a horizontal plane, due to the interposition of the collimating lens 38, appears to move upward or downward in a vertical plane within the field of view of the eyepiece 41; and for all angles of rotation of the light tube 36 in the plane of the paper (Figs. 1 or 2) at which the image of the reticule slits 37a is within the field of view of the eyepiece 41, said image will constitute a horizontal reference with respect to such rotation of the light tube or of the instrument associated in fixed relation therewith. It may be explained that, for purposes of clarity of the drawings, the angle of rotation and the angles of refraction have been somewhat exaggerated in Fig. 2; however, the principles of operation are properly illustrated thereby.

In Fig. 2, a horizontal plane is represented by the dot-and-dash line 56 perpendicular to the vertical line 55. The angle A between the vertical 55 and the axis of the light beam 50' represents the angle of rotation of the sight tube 36' and liquid container 31' from the vertical of the locality, as above mentioned. The dash line 57 is normal to the freely formed surface 30a' of the liquid pool 30' at the point of incidence of the beam 50' upon said liquid surface 30a'. The angle I₁, therefore, is the angle of incidence of the light beam 50' upon the surface 30a' of the liquid. Said angle of incidence I₁ is equal to the rotation angle A. Likewise, the wedge or prism angle W between the reflecting surface 35' and liquid surface 30a' is equal to the rotation angle A. The dot-and-dash line 58 is normal to the surface of the mirror 35' at the point of incidence of the beam 50a'. The angle I₂, therefore, is the angle of incidence of the beam 50a' with respect to the mirror 35' and the angle R₂ is the angle of reflection of the beam 50b'. The dash line 59 is normal to the surface 30a' of the liquid pool at the point of incidence of the beam 50b'. The angle I₃ is the angle of incidence of the beam 50b' and the angle R₃ is the angle of refraction of beam 50c' as it emerges from the liquid 30'.

As an example of the operation when the light tube 36 and liquid container 31 are rotated in the plane of the paper from the vertical position of Fig. 1, assume an angle of rotation A of 3° (Fig. 2). Now the wedge or prism angle W of the liquid pool 30' will likewise be 3° and beam 50' will strike the surface 30a' at angle of incidence I₁ of 3°. In accordance with well-known laws of physics, a beam of light is bent or refracted in passing from one medium to another medium of different density, if its direction when the light waves strike the boundary or surface of the second medium is not perpendicular thereto. The amount of bending of the beam 50a' by the liquid 30', may be determined from Snell's law of refraction that, for all angles of incidence of the beam 50' upon the surface of the liquid 30', the ratio $$\frac{\sin I}{\sin R}$$

(where I is the angle of incidence and R is the angle of refraction) is the same and is equal to a constant known as the index of refraction of the second medium. If the index of refraction of the liquid 30' is 1.5, then Snell's law, as applied to Fig. 2, may be stated algebraically, as follows:

$$\frac{\sin I^1}{\sin R^1} = \text{index of refraction of the liquid } 30' = 1.5$$

Then $$\sin R^1 = \frac{\sin I^1}{1.5} = \frac{.0523}{1.5} = .0349$$

Hence, angle $R_1 = 2°$ (.0349 is the sine of an angle of 2°).

Angle $X = 90° - R_1$.
Hence angle $X = 88°$.
Angle $Y = 180° -$ angle $X -$ angle $W$ [sum of the angles of a triangle equals 180°].
Hence angle $Y = 89°$.
Angle $I_2 = 90° -$ angle $Y = 1°$.
Hence angle $R_2 = 1°$ [the angle of reflection equals the angle of incidence].
Angle $I_2 +$ angle $R_2 +$ angle $R_1 + 90° +$ angle $Z = 180°$.
Hence angle $Z = 86°$. Therefore,
Angle $I_3 = 90° -$ angle $Z = 4°$.

Now since the beam is passing from liquid to air, to derive the angle of refraction $R_3$, the index of refraction of the liquid is equal to the reciprocal of the ratio $$\frac{\sin I_3}{\sin R_3} \text{ or } \frac{\sin R_3}{\sin I_3} = 1.5$$

Then $\sin R_3 = \sin I_3$ times $1.5 = .0698 \times 1.5 = .1047$.
Hence angle $R_3 = 6°$ (.1045 is the sine of an angle of 6°).
Angle $D =$ angle $R_3 = 6°$ [since the beam 50c' intersects the vertical parallel lines 59 and 55 at the same angle].
Angle $A +$ angle $B +$ angle $C = 90°$.
Angle $A = 3°$; angle $B = 45°$; hence angle $C = 42°$.
Angle $C + 90° +$ angle $D +$ angle $E = 180°$. Hence, angle $E = 42°$.
Likewise angle $F = 42°$ [angle of reflection of beam 50d' is equal to the angle of incidence of beam 50c']. Therefore, angle F is equal to the angle C, and consequently, lines 50d' and 56 are parallel and horizontal, since they both make the same angle with the clear glass reflector 43'.

Now, it may be noted, that in the foregoing example, the angle G, which the reflected and refracted beam 50c' as it emerges from the liquid 30' makes with the original beam 50', is equal to the rotation angle A, and likewise, to the wedge angle W. In this connection, angle $A =$ angle $A' = 3°$; angle $A' + 90° +$ angle $C +$ angle $E +$ angle $G = 180°$; hence, angle $G = 3° =$ angle A.

In the use of the horizontal reference means of the invention in its application to a sextant, as illustrated in Fig. 1, the index mirror 5 is adjusted until the image of the selected celestial object 60 sighted upon by the observer, through the eyepiece 41, is brought into coincidence with the image of the reticule slits reflected by the clear glass mirror 43. Fig. 1 illustrates such a condition of coincidence: the light beam 61, from the observed object 60, strikes the index mirror 5, is reflected thereby, as indicated at 61a, to the horizon mirror 3, and again reflected by the latter, as indicated at 61b, to the observer's eye through sight tube 41a. It will be noted that the beam 61b is coincident with the beam 50d, indicating coincidence of the reticule image and the celestial object image as viewed through the eyepiece 41.

At any given setting of the index mirror 5, tilting or rotation of the instrument in the plane of the paper will not disturb the relationship of these images with respect to each other, disregarding accelerations of the liquid; and this is true whether or not the images are in coincidence. In other words, when the instrument is tilted, or rotated, in the plane of the paper, these images appear to move in the same direction and at the same rate, disregarding accelerations of the liquid.

Of course, a rough approximation of the angle of the celestial body with respect to the horizontal plane at the point of observation may be obtained, by reference to the angle between the mirrors 3 and 5, whenever the image of the celestial body is observable through eyepiece 41, but in order to obtain more accurate measurement, some closer point of reference than the relatively broad field of view of the eyepiece 41 must be provided. Furthermore, the reference point must be one that maintains a fixed relation to the image of the celestial body as viewed through eyepiece 41, irrespective of rotation of the instrument in the plane of the axis of sight. It will be apparent from the foregoing, that the horizontal reference means of the invention meets these requirements.

A particular advantage of the horizontal reference means of the invention in its application to use with a sextant is that the reference image, comprising the image of the parallel, closely spaced, reticule slits 37a, is very sharply defined, facilitating the obtaining of more accurate coincidence of the observed and reference images.

As above stated, the liquid pool employed in the horizontal reference means of the invention should preferably have an index of refraction of substantially 1.5, the range of variation from this figure which can be tolerated being determined by the degree of error in horizontality of the beam 50d' which can be tolerated in any particular application of the invention. Necessarily the liquid employed must be transparent. It is quite desirable also that the liquid be of medium viscosity so that it is neither too rapid nor too sluggish in its response to changes in position of the instrument. The liquid should preferably be one subject to minimum change in refractive index with changes in temperature. Liquids which have the desired characteristics in satisfactory degree and which have been found suitable for the purposes of the invention include an aqueous solution of sucrose, and, more specifically, an 83.75% aqueous solution of sucrose, which has an index of refraction of 1.5000; suitable liquids also include organic compounds of the type of the ethane series, and, more specifically, pentachloroethane, which has an index of refraction of 1.501.

Having thus described my invention, what I claim as new and desire to secure by Letters Patent of the United States is:

1. Horizontal reference means of the class described comprising a liquid pool having a freely formed surface, a container therefor, means for directing an original beam of parallel light toward said surface in fixed relation to said container, means for reflecting the light entering said liquid back through the same, said means comprising a reflecting surface with its plane perpendicular to the direction of said original beam, the liquid having an index of refraction such that the beam of light emerging from said freely formed surface makes an angle with the original beam substantially corresponding to the angle of displacement of the original beam from the vertical of the locality, and reflecting means disposed above said liquid pool in the path of said original beam and arranged with its reflecting surface in a plane at an angle of substantially 45° with respect to the axis of said original beam, the plane of said latter reflecting surface being perpendicular to a vertical plane through said original beam.

2. Horizontal reference means of the class described comprising a liquid pool having a freely formed surface, a container thereof, and means for causing an original beam of parallel light to be fixed with respect to said container and to pass into said pool and emerge from said surface, said latter means including a reflecting surface with its plane perpendicular to the direction of the original beam, said liquid having an index of refraction such that the emergent beam makes an angle with the original beam substantially corresponding to the angle of displacement of the latter from the vertical of the locality, and reflecting means having its reflecting surface positioned to reflect said emergent beam and disposed with the plane of its reflecting surface at an angle of substantially 45° with respect to said original beam, the plane of said latter reflecting surface being perpendicular to a vertical plane through said original beam.

3. Horizontal reference means of the class described comprising a liquid pool having a freely formed surface, a container therefor, a light tube associated with said container for directing light into the latter, a collimating lens fixed in said tube, a reticule fixed in said tube and disposed in the focal plane of said lens, said lens being positioned intermediate said reticule and said liquid pool and disposed so that light rays passing through said reticule are rendered parallel with the axis of the tube upon emerging from said lens whereby to provide an original light beam directed towards said liquid surface, reflecting means for reflecting light entering said liquid, said liquid having an index of refraction of substantially 1.5, said reflecting means comprising a reflecting surface with its plane perpendicular to the direction of said original beam, said light tube having a sight opening intermediate said lens and said pool, and reflecting means disposed adjacent the intersection of the axis of said light tube and the axis of sight through said opening, the reflecting surface of said latter means being arranged to reflect the beam emerging from said liquid at an angle of substantially 45° with respect to the axis of said light tube, the plane of said latter reflecting surface being perpendicular to a vertical plane through said original beam.

4. Horizontal reference means of the class described comprising a liquid pool having a freely formed surface, a container therefor, a light tube associated with said container for directing light into the latter, a collimating lens fixed in said tube, a reticule fixed in said tube and disposed in the focal plane of said lens, said lens being positioned intermediate said reticule and said liquid pool and disposed so that light rays passing through said reticule are rendered parallel with the axis of the tube upon emerging from said lens whereby to provide an original light beam directed toward said liquid surface, reflecting means for reflecting light entering said liquid, said reflecting means comprising a reflecting surface with its plane perpendicular to the direction of said original beam, said liquid having an index of refraction such that the beam emerging from said liquid makes an angle with the original beam substantially corresponding to the angle of displacement of the latter from the vertical of the locality, and reflecting means disposed intermediate said lens and said liquid pool and arranged with its reflecting surface in a plane at an angle of substantially 45° with respect to the axis of said original beam, the plane of said latter reflecting surface being perpendicular to a vertical plane through said original beam.

5. Horizontal reference means of the class described comprising a liquid pool having a freely formed surface, a container thereof, means for directing an original beam of parallel light toward said surface in fixed relation to said container, means for reflecting the light entering said liquid back through the same, said means comprising a reflecting surface with its plane perpendicular to the direction of said original beam, said liquid having an index of refraction of substantially 1.5, and reflecting means having its reflecting surface positioned to reflect said emergent beam at an angle of substantially 45° with respect to said original beam, the plane of said latter reflecting surface being perpendicular to a vertical plane through said original beam.

6. Horizontal reference means of the class described comprising a liquid pool having a freely formed surface, a container thereof, means for causing an original beam of parallel light to be fixed with respect to said container and to pass into said pool and emerge from said surface, said latter means including a reflecting surface with its plane perpendicular to the direction of the original beam, said liquid having substantially the viscosity and refractive index characteristics of a substantially 83.75 per cent aqueous solution of sucrose, and reflecting means having its reflecting surface positioned to reflect said emergent beam and disposed with the plane of its reflecting surface at an angle of substantially 45° with respect to said original beam, the plane of said latter reflecting surface being perpendicular to a vertical plane through said original beam.

7. Horizontal reference means of the class described comprising a liquid pool having a freely formed surface, a container thereof, means for causing an original beam of parallel light to be fixed with respect to said container and to pass into said pool and emerge from said surface, said latter means including a reflecting surface with its plane perpendicular to the direction of the original beam, said liquid having substantially the viscosity and refractive index characteristics of pentachlorethane, and reflecting means having its reflecting surface positioned to reflect said emergent beam and disposed with the plane of its reflecting surface at an angle of substantially 45° with respect to said original beam, the plane of said latter reflecting surface being perpendicular to a vertical plane through said original beam.

THOMAS L. THURLOW.